United States Patent [19]

Wofford

[11] Patent Number: 4,588,603

[45] Date of Patent: May 13, 1986

[54] METHOD FOR PREPARING A GELATINOUS FOOD PRODUCT STABILIZER

[76] Inventor: Miles D. Wofford, Rte. 1, Box 222C, Anthony, N. Mex. 88021

[21] Appl. No.: 761,784

[22] Filed: Aug. 2, 1985

[51] Int. Cl.$^4$ ............................................. A23L 1/04
[52] U.S. Cl. ................................. 426/576; 426/578; 426/654; 426/658
[58] Field of Search ................ 426/576, 578, 654, 658

[56] References Cited

U.S. PATENT DOCUMENTS

| | | | |
|---|---|---|---|
| 2,163,164 | 6/1939 | Wickenden | 426/576 |
| 2,558,065 | 6/1951 | Tice | 426/576 |
| 3,763,138 | 10/1973 | Rakoczy | 426/576 |
| 3,889,002 | 6/1975 | Clausi | 426/576 |
| 4,341,810 | 7/1982 | Shank | 426/576 |
| 4,554,169 | 11/1985 | Anderson et al. | 426/576 |

*Primary Examiner*—Jeanette Hunter
*Attorney, Agent, or Firm*—Shlesinger, Arkwright, Garvey & Fado

[57] ABSTRACT

A process for preparing a gelatinous food product stabilizer for maintaining food product integrity under freeze-thaw conditions or the like, including the steps of combining between about 6 and 50 parts of non-halogenated water and about 1 part of about a 1 to 10% acidic solution with about 1 part of gelatinizing agent including granular gelatin at a temperature of between about 32° F. and 75° F. forming an acidic gelatinous aqueous solution, agitating the solution to disperse uniformly the gelatinizing agent throughout the solution forming a gelatinous slurry, maintaining the slurry at between about 32° F. and 75° F. until the gelatin granules have become partially swollen and hydrated, agitating and heating the slurry to a temperature of between about 90° F. and 115° F. until the gelatin granules are further swollen and hydrated and the slurry becomes smooth and non-granular to feel, and further heating and agitating the slurry until a uniformly clear solution is obtained.

10 Claims, No Drawings

METHOD FOR PREPARING A GELATINOUS FOOD PRODUCT STABILIZER

FIELD OF THE INVENTION

The present invention generally relates to a method for preparing a gelatinous food product stabilizer and more particularly to the use of a so prepared gelatinous food product stabilizer in various food products so as to stabilize the food products against degradation in terms of food product consistency, integrity, flavor and mouth feel during periods of refrigeration, during freeze-thaw transitions, and during heating or reheating including microwaving.

BACKGROUND OF THE INVENTION

It is widely known that many prepared food products are susceptable to degradation when subjected to freeze-thaw conditions. This is particularly true in regard to products which contain oil emulsion type food dressings such as tuna salad, egg salad, chicken salad, potato salad, maccaroni salad and cole slaw. Upon freeze-thaw these products lose their consistency, flavor, and mouth feel.

One cause for this degradation is a non-reversible breakdown of the oil emulsion during freezing. Another factor is an accumulation of excess moisture within the food product during the freeze-thaw period.

Other prepared food products in addition to those mentioned above encounter deterioration upon freezing and subsequent reheating in either conventional or microwave ovens. These products include gravies, egg products such as omelettes, scrambled eggs, and fried eggs, french fried potatos, onion rings, tortillas, burritos, tacos, enchiladas, fried chicken, chicken fried steaks, chili and barbecue.

In the case of gravies, freeze-thaw with subsequent reheating causes a deterioration in terms of consistency or viscosity causing the products to acquire an unpleasant mouth feel.

Similarly, when burritos, enchiladas or similar food products are frozen and subsequently reheated, they become runny and acquire an unacceptable soggy consistency.

The main factor which appears to be accountable for this deterioration is the inability of the products to retain moisture during the various temperature transitions.

It would therefore be greatly beneficial to provide a food product stabilizer which would prevent deterioration of the food product during freeze-thaw conditions or the like, and which would be compatible when applied to or admixed with food products of the type mentioned above without altering the natural food product taste.

SUMMARY AND OBJECTS OF THE INVENTION

According to the present invention, it is been found that increasing the extent of hydration of gelatin granules in a modified aqueous solution prior to the dissolution of the gelatin granules at an elevated temperature above the melting range of the granules results in an increase in the moisture binding capacity of the so-formed gelatinous stabilizer, thus allowing the stabilizer to be admixed with, coated onto or otherwise incorporated into a wide variety of prepared food products, thereby increasing the stability of the food products against separation or other deleterious break down normally occurring during refrigeration, freeze-thawing or reheating.

It has been discovered that when granular gelatin is added to boiling water, the gelatin granules undergo only a partial hydration before desolving i.e. before a colloidal system is formed. In a similar manner, when granular gelatin is added to water and rapidly heated to the gelatinization temperature, the gelatin granules to not fully hydrate. A gelatinous solution prepared in this manner will not function as an effective moisture stabilizing agent for food products under freeze-thaw conditions. Upon thawing, sufficient water seepage will occur to render the food products unsuitable in terms of appearance, viscosity and mouth feel.

The gelatinous food product stabilizer prepared according to the present invention does not suffer the aforementioned drawbacks in that the gelatin granules are allowed to achieve maximum hydration prior to dissolution.

It is therefore an object of the present invention to provide a gelatinous food product stabilizer which retains its moisture locking properties under normal refrigeration, as well as during freeze-thaw transitions and reheating.

It is another object of the present invention to provide a gelatinous food product stabilizer in which the gelatin granules are allowed to fully hydrate and swell prior to dissolving.

It is another object of the present invention to provide a food product stabilizer which may be used as a viscosity control agent.

A further object of the present invention is to provide a food product stabilizer which does not adversely affect the normal flavor of the food products being treated.

A still further object of the present invention is to provide a food product stabilizer which is readily compatable with a wide variety of food products.

These and other objects and advantages of the present invention will appear from the following detailed description.

DETAILED DESCRIPTION OF THE INVENTION

According to a first embodiment of the invention, a gelatinous food product stabilizer is prepared from a mixture comprising non-halogenated water, an acid constituent and gelatin in granular or particulate form. The gelatin granules are allowed to hydrate and expand under controlled conditions pior to dissolution thereby increasing the moisture binding capacity of the so-prepared food stabilizing composition.

Non-halogenated water, such as distilled water is essential to the process since it has been found that chlorinated water such as normal tap water adversely affects the extent of hydration of the gelatin granules. In addition, it has been found that the addition of an acid constituent such as vinegar, citric acid or the like has a beneficial effect in regard to hydration of the gelatin granules.

In preparing the stabilizer, between 6 and 50 parts of non-halogenated water and about 1 part of about a 1 to 10% acidic solution are combined and mixed at a temperature of between about 32° F. and 75° F. About 1 part of generally granular gelatin is slowly added to the modified aqueous solution to form an acidic gelatinous aqueous solution. The solution is then agitated for a period of time sufficient to disperse uniformly the gelatinizing agent throughout the solution so as to form a gelatinous slurry. The agitation usually continues for approximately 5 minutes. Next, the slurry is maintained at a temperature of between about 32° F. and 75° F. until the gelatin granules have become partially swollen and hydrated, usually between 15 and 25 minutes. The slurry is then agitated and heated to a temperature of between about 90° F. and 115° F. until the gelatin granules become further swollen and hydrated whereby the slurry becomes smooth and non-granular to feel. The slurry is usually held at this temperature for a period of between 10 and 30 minutes. The slurry is then further heated under agitation to a temperature of between about 150° F. and 160° F. until a uniformly clear solution is obtained. At this stage, the stabilizer may be cooled and subsequently added to the food product, generally at a temperature above 75° F. This stabilizer is especially suitable for stabilizing food products including vegetable salads, meat salads, gravies, egg products and dehydrated food products.

According to a second embodiment of the invention, the gelatinous food product stabilizer is prepared from non-halogenated water, an acid constituent and a mixture of gelatin and starch. The gelatin to starch ratio is usually maintained between about 1:6 to 1:1.

When pre-gelatinized instant starch is utilized, the gelatinous stabilizer is prepared by combining between about 6 and 50 parts of non-halogenated water and about 1 part of about 1 to 10% acidic solution with about 1 part of a mixture of gelatin and starch (the gelatin to starch being in a proportion of 1:6 to 1:1) at a temperature of between about 32° F. and 75° F. forming an acidic gelatinous aqueous solution. It may be preferable to combine the water and acid constituents prior to adding the gelatin/starch mixture. The solution is then agitated for a period of time sufficient to thoroughly mix the gelatin and starch throughout the solution so as to form a gelatinous slurry. Agitating the solution for about 5 minutes is usually sufficient for this purpose. The slurry is then maintained at a temperature of between 32° F. and 75° F. until the gelatin granules have become partially swollen and hydrated. This step is usually conducted for between 15 and 25 minutes. Next, the slurry is heated to a temperature of between about 90° F. and 115° F. and is maintained at this temperature for about 10 to 30 minutes at which time both the gelatin as well as the pre-gelatinized starch are fully hydrated and wherein the slurry has been transformed into a uniformly clear solution. The solution may then be cooled before being added to the food product. The solution is generally added to the food product at a temperature above 75° F. A stabilizer prepared according to the method above is especially suitable although not limited to use in gravies and oil emulsion food products such as mayonnaise or salad dressings. It should be further noted that less than 1 part of acid solution may be used in the above embodiment.

According to a third embodiment of the invention, a gelatinous food product stabilizer is prepared from non-halogenated water, an acid constituent and a mixture of gelatin and non-gelatinized starch. By non-gelatinized starch, it is meant starch which must be cooked before use. The stabilizer is formed by combining between about 6 and 50 parts of non-halogenated water and about 1 part of about a 1 to 10% acidic solution with about 1 part of a mixture of gelatin and non-gelatinized starch (the gelatin to starch ratio being between 1:6 to 1:1) at a temperature of between about 32° F. and 75° F. thereby forming an acidic gelatinous aqueous solution. The water and acid constituents may be combined before adding the gelatin/starch mixture. Next, the solution is agitated to disperse uniformly the gelatin and starch throughout the solution thereby forming a gelatinous slurry. The agitation may be continued for about 5 minutes. The slurry is then maintained at about 32° F. to about 75° F. until the gelatin granules have become partially swollen and hydrated. This hydration step usually takes between 15 to 25 minutes. The slurry is then heated to between about 90° F. and 115° F. and maintained at this temperature for about 10 to 30 minutes under agitation. At this point, the gelatin granules have become fully hydrated. Next, the slurry is raised to a temperature of between about 180° F. and 200° F. and maintained at this temperature for between 10 to 20 minutes. The stabilizer may then be cooled prior to being added to the food product. The stabilizer is usually added to the food product at a temperature above 75° F.

This stabilizer has been found to be particularly suitable for use in gravies and products formed with oil emulsions such as mayonnaise and salad dressings. It should be noted that less than 1 part of acidic solution may be used in order to avoid altering the flavor of the food product being treated.

EXAMPLE 1

A food stabilizer was formed by combining 8 parts of distilled water with 1 part of 5% acid vinegar at 50° F. After mixing the solution, 1 part of generally granular gelatin was added to the solution. The solution was then agitated for 5 minutes forming a slurry, and was allowed to stand at room temperature for 20 minutes. The slurry was then heated to 110° F. and was held at that temperature for 10 minutes under slow agitation. After 10 minutes, the slurry was heated to a temperature of 110° F. and was maintained at that temperature for an additional 10 minutes under slow agitation. After 10 minutes, the temperature of the slurry was raised during a 5 minute period to 155° F. under slow agitation. The mixture was finally cooled to 140° F. at which time it was ready for use as a food stabilizer.

EXAMPLE 2

A gelatinous food product stabilizer was prepared by combining 11.2 parts of distilled water with 0.15 part of 5% acid vinegar and was mixed at a temperature of 50° F. A mixture of 0.15 part of granuler gelatin and 0.75 part of pre-gelatinized instant starch was slowly added to the acidified solution. The solution was then agitated for 5 minutes dispersing the gelatin and starch forming a slurry. The slurry was allowed to stand at room temperature for 20 minutes. Next, the slurry was raised to a temperature of 110° F. and was maintained at that temperature for 20 minutes under slow agitation. After 20 minutes, the mixture was cooled to 80° F. and was ready for use.

EXAMPLE 3

A gelatinous food product stabilizer was prepared by combining 11.2 parts of distilled water with 0.15 part of 5% acid vinegar at a temperature of 50° F. After agitation, a mixture of 0.15 part of granular gelatin and 0.75 part of non-gelatinized starch was slowly added to the acidified solution. The solution was then mixed for 5 minutes to cause the gelatin and starch to disperse thereby forming a slurry. The slurry was allowed to stand at room temperature for 20 minutes to allow partial hydration of the gelatin. Next, the slurry was heated to 110° F. and was maintained at that temperature for 10 minutes under slow agitation. After 10 minutes, the slurry was heated to a temperature of 190° F. and was maintained at that temperature for an additional 10 minutes so as to allow hydration of the starch. After 10 minutes, the mixture was cooled to 80° F. at which time the stabilizer was ready to be incorporated into the food product.

While this invention has been described in connection with different embodiments thereof, it will be understood that it is capable of further modifications, and this application is intended to cover any variations, uses, or adaptations of the invention following in general, the principles of the invention and including such departures from the present disclosure as come within known or customary practice in the art to which the invention pertains, and as may be applied to the essential features hereinbefore set forth and followed in the scope of the invention or the limits of the appended claims.

What is claimed is:

1. A process for preparing a gelatinous food product stabilizer for maintaining food product integrity under freeze-thaw conditions or the like, including the steps of:
   (a) combining between about 6 and 50 parts of non-halogenated water and about 1 part of about a 1 to 10% acidic solution with about 1 part of gelatinizing agent including granular gelatin at a temperature of between about 32° F. and 75° F. forming an acidic gelatinous aqueous solution,
   (b) agitating said solution to disperse uniformly said gelatinizing agent throughout said solution forming a gelatinous slurry,
   (c) maintaining said slurry at between about 32° F. and 75° F. until said gelatin granules have become partially swollen and hydrated,
   (d) agitating and heating said slurry to a temperature of between about 90° F. and 115° F. until said gelatin granules are further swollen and hydrated and said slurry becomes smooth and non-granular to feel, and
   (e) further heating and agitating said slurry until a uniformly clear solution is obtained.

2. A process as defined in claim 1, including the step of:
   (a) combining and mixing said non-halogenated water and said acid solution prior to adding said gelatinizing agent.

3. A process as defined in claim 1, wherein:
   (a) said non-halogenated water is distilled water and said acid solution is commercial vinegar.

4. A process as defined in claim 1, wherein:
   (a) said gelatinizing agent is solely granular gelatin.

5. A process as defined in claim 4, including the steps of:
   (a) forming said acidic gelatinous aqueous solution by combining about 8 parts of non-halogenated water and about 1 part of 5% acid vinegar with about 1 part of granular gelatin at a temperature of about 50° F.,
   (b) agitating said solution for about 5 minutes forming said gelatinous slurry,
   (c) maintaining said slurry at about 50° F. for about 15 to 25 minutes thereby partially swelling and hydrating said gelatin granules,
   (d) agitating and heating said slurry to about 110° F.,
   (e) agitating and maintaining said slurry at about 110° F. for about 10 to 30 minutes,
   (f) further agitating and heating said slurry to a temperature of about 155° F. obtaining said clear solution,
   (g) cooling said clear solution prior to admixing with said food products to be stabilized.

6. A process as defined in claim 1, wherein:
   (a) said gelatinizing agent is a mixture of gelatin and starch, and
   (b) said gelatin to starch ratio being between about 1:6 to 1:1.

7. A process as defined in claim 6, wherein:
   (a) said starch is pre-gelatinized instant starch.

8. A process as defined in claim 7, including the steps of:
   (a) forming said acidic gelatinous aqueous solution by combining about 11 parts of non-halogenated water and about 0.15 part of 5% acid vinegar with about 0.15 part of granular gelatin and about 0.75 part of pre-gelatinized instant starch at a temperature of about 50° F.;
   (b) agitating said solution for about 5 minutes forming said gelatinous slurry,
   (c) maintaining said slurry at about 50° F. for about 15 to 25 minutes thereby partially swelling and hydrating said gelatin granules,
   (d) agitating and heating said slurry to about 110° F., and,
   (e) agitating and maintaining said slurry at about 110° F. for about 10 to 30 minutes.

9. A process as defined in claim 6, wherein:
   (a) said starch is non-gelatinized starch.

10. A process as in claim 9, including the steps of:
    (a) forming said acidic gelatinous aqueous solution by combining about 11 parts of non-halogenated water and about 0.15 part of 5% acid vinegar with about 0.15 part of granular gelatin and about 0.75 part of non-gelatinized starch at a temperature of about 50° F.,
    (b) agitating said solution for about 5 minutes forming said gelatinous slurry,
    (c) maintaining said slurry at about 50° F. for about 15 to 25 minutes thereby partially swelling and hydrating said gelatin granules,
    (d) agitating and heating said slurry to about 110° F.,
    (e) agitating and maintaining said slurry at about 110° F. for about 10 to 30 minutes, and
    (f) further agitating and heating said slurry to a temperature of about 190° F. obtaining said clear solution.

* * * * *